Figure 1:
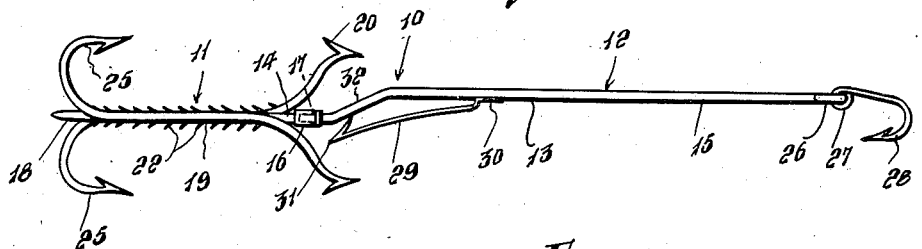

May 6, 1941.  W. M. MOATS  2,241,152

FISHING LURE

Filed Nov. 30, 1939

Inventor
W. M. Moats
By L. F. Randolph
Attorney

Patented May 6, 1941

2,241,152

UNITED STATES PATENT OFFICE 2,241,152

FISHING LURE

Willie M. Moats, Cairo, W. Va.

Application November 30, 1939, Serial No. 306,946

9 Claims. (Cl. 43—40)

This invention relates to a novel fishing lure adapted for use for gar fishing and casting.

It is a primary aim of this invention to provide a fishing lure having a wedge portion for catching gars and other fish having long bone-like bills or jaws.

Another aim of the invention is to provide in combination with the wedge means, a plurality of hooks projecting outwardly from the lure body and extending downwardly and upwardly relatively thereto, to adapt the lure for use in casting.

It is a further object of the invention to provide a lure of the character as heretofore described, including a stem or shank formed of detachably connected sections, one of which is provided with the wedge means and casting hooks, the other of which, may be provided with means for holding live bait such as minnows, worms, grasshoppers, crickets or the like, or which may be provided with a permanently mounted artificial lure body.

Figure 2:
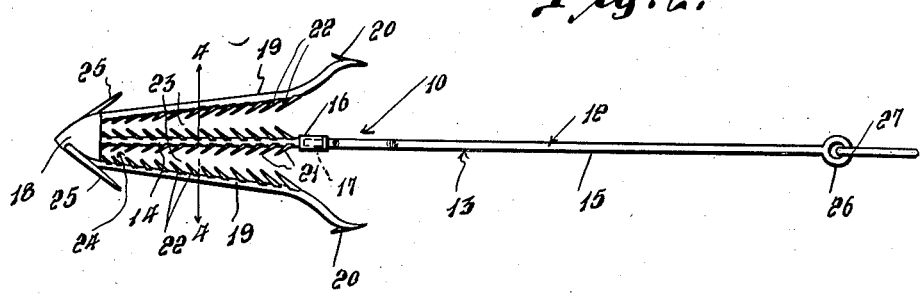
Figure 3:
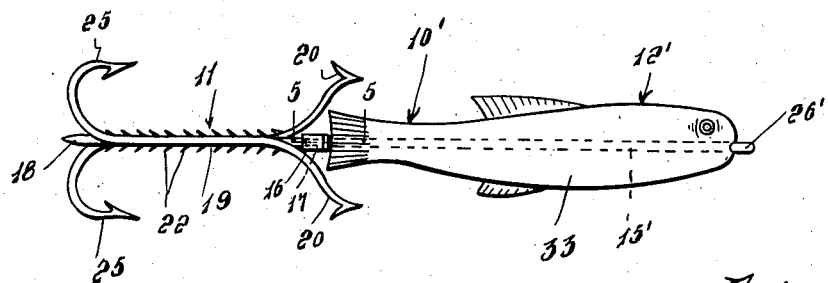
Figure 4:
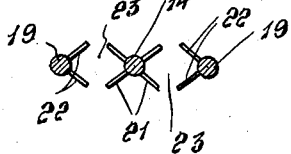
Figure 5:
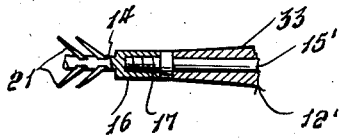

Other objects and advantages of the invention will hereinafter become more fully apparent from the following description of the drawing, which illustrates a preferred embodiment thereof, and wherein:

Figure 1 is a side elevational view of the lure body assembled and including means for detachably engaging a live bait, Figure 2 is a top plan view of the same, Figure 3 is a view similar to Figure 1 showing the lure provided with an artificial lure body, Figure 4 is an enlarged transverse sectional view taken substantially along the plane of the line 4—4 of Figure 2, and Figure 5 is an enlarged detail sectional view taken substantially along the plane of the line 5—5 of Figure 3.

Referring more particularly to the drawing, wherein like reference characters designate like or corresponding parts throughout the different views, 10 designates generally the lure, as illustrated in Figures 1 and 2 and comprising generally the sections 11 and 12. The lure 10 includes a stem or shank 13 and comprising the portions 14 and 15. Portion 14 is provided at one end with an internally threaded socket, as best seen in Figure 5, designated 16 for receiving the threaded end 17 of the portion 15, for detachably connecting the stem portions 14 and 15. The opposite end of the stem portion 14 is provided with a spear head 18 from which project the corresponding shanks 19. Shanks 19 extend toward the opposite end of the lure 10 in diverging relationship relatively to each other. Adjacent their free ends, the shanks 19 are flared outwardly with one of said ends bent to extend downwardly and the other end bent to extend upwardly relatively to the horizontal plane of the lure 10, as best seen in Figure 1. The free ends of the shanks 19 are provided with the barbed hooks 20.

As best seen in Figures 2 and 4, the stem portion 14 is provided with four rows of tapered barbs 21 which are disposed diagonally to the horizontal plane of the lure 10 and the shank portions 19 are each provided with two rows of similar barbs 22 which project toward the free ends of the adjacent rows of barbs 21, as best seen in Figure 4. The barbs of the rows 21 and 22 are obliquely disposed relatively to the portions 14 and 19, respectively, each of the barbs of the rows 21 and 22 extending toward the head 18 to form the inwardly converging spaces 23, as best seen in Figure 2. Portions 14, 19, barbs 21 and 22, together with the head 18 combine to form the wedge, designated generally 24.

Head 18 is also provided with the corresponding hooks 25 one of which extends outwardly and upwardly relatively to the lure body while the other extends outwardly and downwardly relatively thereto, as best seen in Figures 1 and 2. The hooks 25 are provided with barbed ends and are disposed in opposite relationship to the hooks 20 so that a hook is disposed above and beneath each side of the lure 10.

Section 15 is provided at its opposite end with an eyelet 26 in which is pivotally mounted an eyelet 27 of a hook 28 to pivotally mount said hook relatively to the stem portion 15. Adjacent its opposite end, stem section 15 is provided with a hook 29 the shank end of which is secured thereto, intermediate of its ends, at 30 to position its opposite, barbed end 31 adjacent the end 17. Stem section 15, adjacent the end 17 is provided with the oblique portion 32 for offsetting end 16, downwardly, relatively to its opposite end.

From the foregoing it will be seen, that the section 12 may readily be baited with a live minnow for gar fishing by passing the barbed end 31 of the hook 29 through the gills of the minnow and out through its mouth or through the side of the head and out through the mouth, after which the tail is connected to the hook 28 for mounting the minnow along the stem portion 15. When a gar or other fish having a long bone-like bill or jaws strikes the minnow, not shown, a jerk on the fishing line, not shown, which is attached to the eyelet 26, will pull the lure 10 forwardly and cause the jaws of the fish to be wedged between the rows of barbs 21 and 22, and the more pressure that is applied the tighter the jaws will be wedged in the spaces 23.

In using the lure 10 for casting a minnow or other live fish bait may be attached to the section 12 with the head of the bait engaged by the hook 28 and the tail connected to the hook 29, or worms or other smaller bait may be attached to the hook 29. When the lure 10 is thus used for casting, as for game fish, the catch is made on one of the hooks 20 or 25. It will thus be seen that the stem portion 11 is adapted for either gar fishing or casting.

Referring now to Figure 3, a lure, designated generally 10', includes the section 11 and the section 12' which is substituted for the section 12 of the lure 10. Section 12' includes the stem portion 15' having the eyelet 26' at one end thereof to receive an end of a fishing line and a threaded portion 17 at its opposite end to engage the socket 16 for connecting the section 12' and the section 11. Stem section 15' is not provided with the hooks 28 and 29 but in lieu thereof, an artificial lure body 33, of any desired type, is mounted on the stem section 15'. It will thus be seen, that a number of different types of live or artificial lures may be attached to the section 11 to thus adapt it to different types of fishing, by simply disconnecting the sections at 16, 17 and applying another forward section containing a different form of bait.

Various modifications and changes are contemplated and may be resorted to as only a preferred embodiment thereof has been disclosed.

I claim as my invention:

1. A fishing lure comprising a stem having wedge means at one end thereof converging toward said end, said wedge means including bars secured to said end of the stem and extending therealong in diverging relationship to each other and to the stem.

2. A device as in claim 1, said wedge means including inwardly diverging barbs.

3. A fishing lure including a shank having a head at one end thereof, bars projecting from said head and diverging toward the opposite end of the shank, rows of barbs formed on said bars and projecting inwardly therefrom, rows of barbs formed on the contiguous portion of said shank and projecting outwardly therefrom, said barbs being disposed obliquely to the shank and bars and projecting toward said head to form converging spaces therebetween.

4. A device as in claim 3, comprising barbed hooks formed on the ends of said bars, and hooks secured to and projecting outwardly from said head.

5. A fishing lure including a shank formed of detachably connected sections, one of said sections being provided with a wedge, and said wedge comprising rows of rearwardly converging barbs.

6. A fishing lure comprising a stem formed of sections detachably connected intermediate of their ends, a head on the opposite end of one of said sections, bars projecting from said head, in diverging relationship, toward the opposite end of the section, said bars and the shank portion of said section being provided with rows of obliquely disposed barbs extending toward the head and forming inwardly converging spaces between said stem portion and bars, said bars terminating in outwardly flared hooks, and hooks formed on said head and projecting outwardly therefrom.

7. In a fishing lure, a stem having a head at one end thereof, a bar rigidly secured at one end to said head and projecting therefrom in diverging relationship to the contiguous portion of the stem to form therewith an impaling wedge, and said bar and contiguous portion of the stem being each provided with rows of barbs extending into the space therebetween and obliquely toward said head.

8. In a fishing lure, a stem having a head at one end thereof, bars rigidly secured at one end to and projecting from said head toward the opposite end of the stem, and said bars being disposed in diverging relationship relatively to each other and to the stem and forming spaces between the bars and stem, said spaces tapering toward the head, said bars and stem being provided with barbs projecting into said spaces and disposed to project toward the restricted ends thereof.

9. In a fishing lure, a stem having a head at one end thereof, bars rigidly secured at one end to and projecting from said head toward the opposite end of the stem, and said bars being disposed in diverging relationship relatively to each other and to the stem and forming spaces between the bars and stem, said spaces tapering toward the head, said bars having oppositely curved free ends provided with barbed hooks, and hooks formed on said head and projecting therefrom, said last mentioned hooks being disposed in alternate relationship to the first mentioned hooks.

WILLIE M. MOATS.